United States Patent
Nice et al.

(10) Patent No.: US 8,983,888 B2
(45) Date of Patent: Mar. 17, 2015

(54) EFFICIENT MODELING SYSTEM FOR USER RECOMMENDATION USING MATRIX FACTORIZATION

(71) Applicant: Microsoft Corporation, Redmond, WA (US)

(72) Inventors: Nir Nice, Kfar Veradim (IL); Noam Koenigstein, Ra'anana (IL); Ulrich Paquet, Cambridge (GB); Shahar Keren, City Hemed (IL); Daniel Sitton, Tel Aviv (IL); Dror Kremer, Tel Aviv (IL); Shai Roitman, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 254 days.

(21) Appl. No.: 13/670,782

(22) Filed: Nov. 7, 2012

(65) Prior Publication Data

US 2014/0129500 A1 May 8, 2014

(51) Int. Cl.
| | | |
|---|---|---|
| *G06F 17/00* | (2006.01) | |
| *G06F 7/00* | (2006.01) | |
| *G06F 7/60* | (2006.01) | |
| *G06N 5/02* | (2006.01) | |
| *G06Q 30/00* | (2012.01) | |

(52) U.S. Cl.
CPC . *G06N 5/02* (2013.01); *G06Q 30/00* (2013.01)
USPC .................................. 706/45; 707/759; 703/2

(58) Field of Classification Search
None
See application file for complete search history.

(56) References Cited

U.S. PATENT DOCUMENTS

| | | |
|---|---|---|
| 6,092,049 A | 7/2000 | Chislenko et al. |
| 7,739,314 B2 | 6/2010 | Datar et al. |
| 8,131,732 B2 * | 3/2012 | Yu et al. .................. 707/748 |
| 2006/0259344 A1 | 11/2006 | Patel et al. |
| 2009/0299996 A1 | 12/2009 | Yu et al. |
| 2011/0179081 A1 | 7/2011 | Ovsjanikov et al. |
| 2011/0246573 A1 | 10/2011 | Liu et al. |
| 2012/0030159 A1 * | 2/2012 | Pilaszy et al. ................ 706/46 |
| 2012/0059788 A1 * | 3/2012 | Sekino ........................ 706/52 |
| 2013/0124449 A1 * | 5/2013 | Pinckney et al. ............. 706/52 |
| 2013/0226839 A1 * | 8/2013 | Archambeau et al. ......... 706/12 |

OTHER PUBLICATIONS

Dean, et al., "MapReduce: Simplified Data Processing on Large Clusters", in Proceedings of the 6th Symposium on Operating System Design and Implementation, Dec. 6, 2004, 13 pages.

(Continued)

*Primary Examiner* — Alan Chen
(74) *Attorney, Agent, or Firm* — Nicholas Chen; Kate Drakos; Micky Minhas

(57) ABSTRACT

A technique for efficiently factoring a matrix in a recommendation system. Usage data for a large set of users relative to a set of items is provided in a usage matrix R. To reduce computational requirements, the usage matrix is sampled to provide a reduced matrix R'. R' is factored into a user matrix U' and an item matrix V. User vectors in U' and V are initialized and then iteratively updated to arrive at an optimal solution. The reduced matrix can be factored using the computational resources of a single computing device, for instance. Subsequently, the full user matrix U is obtained by fixing V and analytically minimizing an error in UV=R+error. The computations of this analytic solution can be divided among a set of computing devices, such as by using a map and reduce technique. Each computing device solves the equation for different respective subset of users.

20 Claims, 12 Drawing Sheets

(56) References Cited

OTHER PUBLICATIONS

Papadimitriou, et al., "DisCo: Distributed Co-clustering with MapReduce", in Eight IEEE International Conference on Data Mining, Dec. 15, 2008, 10 pages.
Schelter, et al., "Scalable Similarity-Based Neighborhood Methods with MapReduce", Retrieved on: Jun. 27, 2012, Available at: http://ssc.io/wp-content/uploads/2011/12/rec11-schelter.pdf.
Ott, Patrick, "Incremental Matrix Factorization for Collaborative Filtering", in Proceedings of Contributions to Science, Technology and Design, Jan. 2008, 10 pages.
Gemulla, et al., "Large-Scale Matrix Factorization with Distributed Stochastic Gradient Descent", in Proceedings of the 17th ACM SIGKDD International Conference on Knowledge Discovery and Data Mining, Aug. 21, 2011, 9 pages.
Lee, Kyong-Ha, et al., "Parallel Data Processing with MapReduce: A Survey," SIGMOD Record, Dec. 2011, vol. 40, No. 4, 10 pages.
Koenigstein, Noam, et al., "Efficient Retrieval of Recommendations in a Matrix Factorization Framework," CIKM '12, Oct. 29-Nov. 2, 2012, Maui, HI, USA, 10 pages.
Hoyer, Patrik O., "Non-negative Matrix Factorization with Sparseness Constraints," Journal of Machine Learning Research 5, published Nov. 2004, 13 pages.
Koren, Yehuda, et al., "Matrix Factorization Techniques for Recommender Systems," IEEE Computer Society, Aug. 2009, 8 pages.
Koenigstein, Noam, et al., "The Xbox Recommender System," RecSys '12, Sep. 9-13, 2012, Dublin, Ireland, UK, 4 pages.
Zhang, Sheng, et al., "Learning from Incomplete Ratings Using Non-negative Matrix Factorization," SDM 2006, Apr. 2006, 5 pages.
"International Search Report & Written Opinion for PCT Application No. PCT/US2013/068994", Mailed Date: Jul. 18, 2014, Filed Date: Nov. 7, 2013, 13 Pages.
Jamali, et al., "A Matrix Factorization Technique with Trust Propagation for Recommendation in Social Networks", in Proceedings of the Fourth ACM conference on Recommender Systems, Sep. 26, 2010, pp. 135-142.
Symeonidis, Panagiotis, "Content-Based Dimensionality Reduction for Recommender Systems", in Proceedings of the 31st Annual Conference of the Gesellschaft für Klassifikation, Mar. 7, 2007, 8 Pages.
Ekstrand, et al., "Collaborative Filtering Recommender Systems", in Journal of Foundations and Trends in Human-Computer Interaction, vol. 4, Issue 2, Feb. 2011, pp. 81-173.

\* cited by examiner

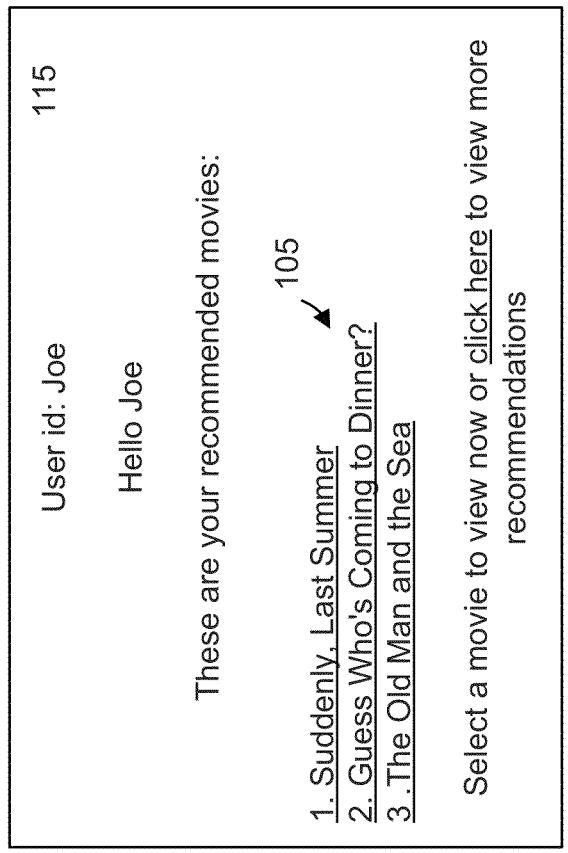

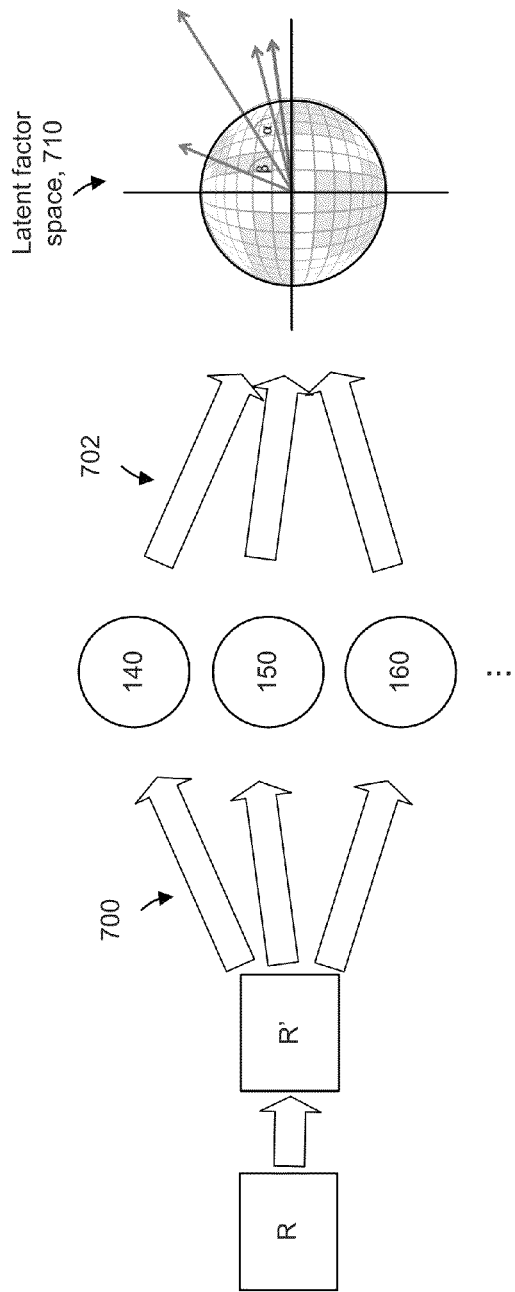
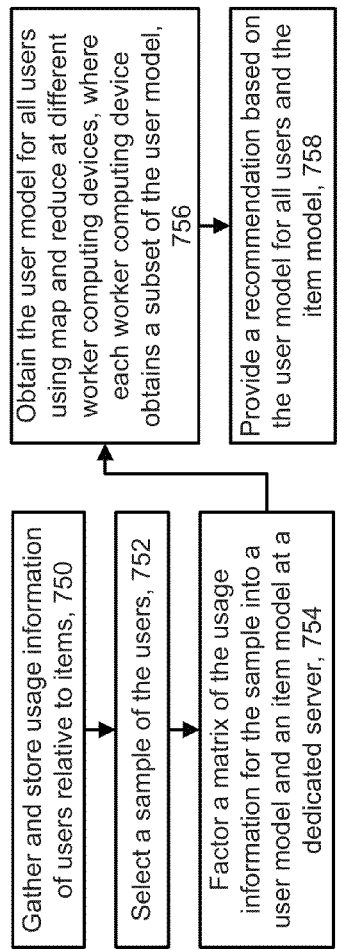

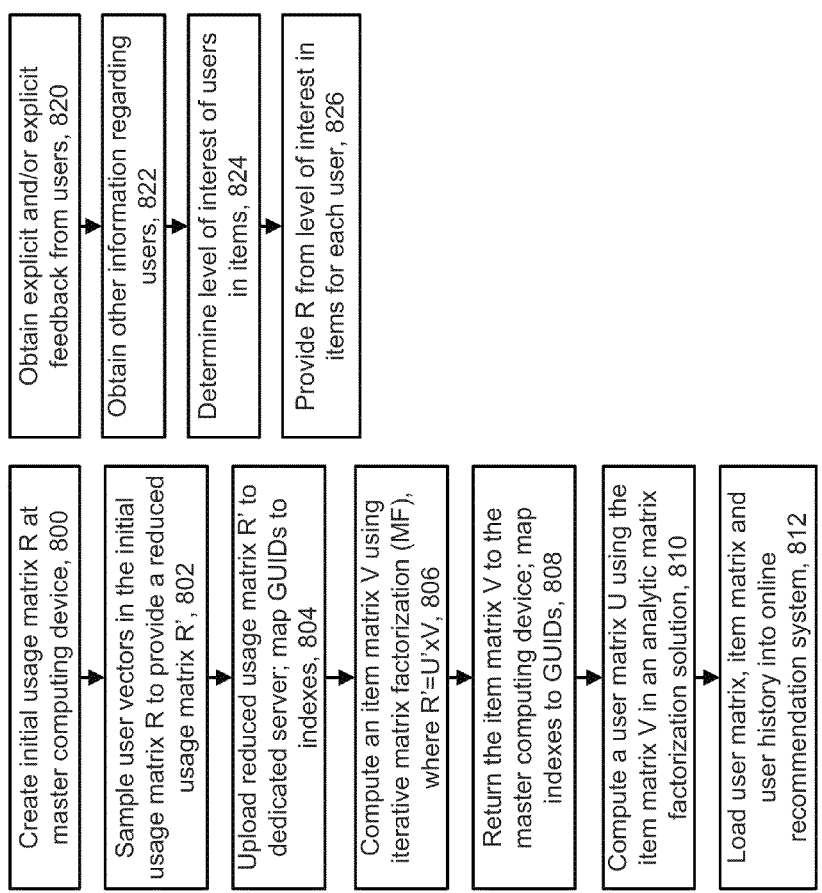

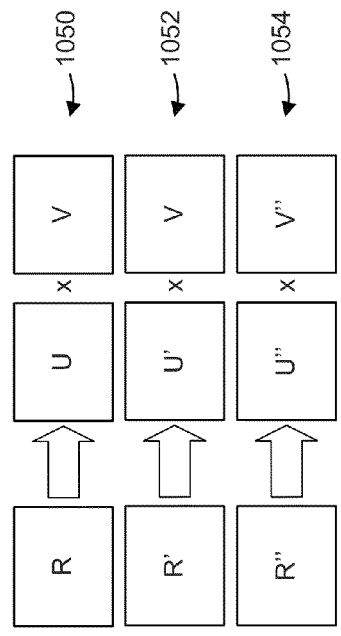

FIG. 10D

|  | v̄R"(1) | v̄R"(3) | v̄R"(5) |
|---|---|---|---|
| R1/ūR"(1) | r(1,1) | r(1,3) | r(1,5) |
| R51/ūR"(2) | r(2,1) | r(2,3) | r(2,5) |
| R101/ūR"(3) | r(3,1) | r(3,3) | r(3,5) |
| R151/ūR"(4) | r(4,1) | r(4,3) | r(4,5) |
| R201/ūR"(5) | r(5,1) | r(5,3) | r(5,5) |
| R251/ūR"(6) | r(6,1) | r(6,3) | r(6,5) |
| R301/ūR"(7) | r(7,1) | r(7,3) | r(7,5) |
| R351/ūR"(8) | r(8,1) | r(8,3) | r(8,5) |
| R401/ūR"(9) | r(9,1) | r(9,3) | r(9,5) |
| R451/ūR"(10) | r(10,1) | r(10,3) | r(10,5) |

Reduced usage matrix R" (from sampling user vectors and items)

FIG. 10F item matrix V"

|  | v̄V"(1) | v̄V"(3) | v̄V"(5) |
|---|---|---|---|
| F̄V"(1) | v(1,1) | v(1,3) | v(1,5) |
| F̄V"(2) | v(2,1) | v(2,3) | v(2,5) |
| F̄V"(3) | v(3,1) | v(3,3) | v(3,5) |
| F̄V"(4) | v(4,1) | v(4,3) | v(4,5) |

FIG. 10E user matrix U"

|  | F̄U"(1) | F̄U"(2) | F̄U"(3) | F̄U"(4) |
|---|---|---|---|---|
| R1/ūU"(1) | u(1,1) | u(1,2) | u(1,3) | u(1,4) |
| R51/ūU"(2) | u(2,1) | u(2,2) | u(2,3) | u(2,4) |
| R101/ūU"(3) | u(3,1) | u(3,2) | u(3,3) | u(3,4) |
| R151/ūU"(4) | u(4,1) | u(4,2) | u(4,3) | u(4,4) |
| R201/ūU"(5) | u(5,1) | u(5,2) | u(5,3) | u(5,4) |
| R251/ūU"(6) | u(6,1) | u(6,2) | u(6,3) | u(6,4) |
| R301/ūU"(7) | u(7,1) | u(7,2) | u(7,3) | u(7,4) |
| R351/ūU"(8) | u(8,1) | u(8,2) | u(8,3) | u(8,4) |
| R401/ūU"(9) | u(8,1) | u(8,2) | u(8,3) | u(8,4) |
| R451/ūU"(10) | u(9,1) | u(9,2) | u(9,3) | u(9,4) |

FIG. 10G

Mapping 1050

| User | index in R | index in R', R" or U' |
|---|---|---|
| GUID(Joe) | 1 | 1 |
| GUID(Jim) | 51 | 2 |
| GUID(Lou) | 101 | 3 |
| GUID(Beth) | 151 | 4 |
| GUID(Kim) | 201 | 5 |
| GUID(Kate) | 251 | 6 |
| GUID(Sue) | 301 | 7 |
| GUID(Jack) | 351 | 8 |
| GUID(Betsy) | 401 | 9 |
| GUID(Kelly) | 451 | 10 |

EFFICIENT MODELING SYSTEM FOR USER RECOMMENDATION USING MATRIX FACTORIZATION

BACKGROUND

Recommendation systems are used to recommend items to users. For example, a web site can recommend an item such as a book, web article, movie, restaurant or other product or service in which a particular user might be interested. Recommendation systems analyze patterns of user behavior as well as features of the items to provide personalized recommendations based on a user's interests, an item's features or some combination thereof. A matrix of data can be developed over time with entries which indicate a particular user's interest in particular items based on explicit or implicit feedback. The matrix can be processed to estimate a user's interest in other items for which feedback has not been provided and a recommendation for one or more of the others items can thereby be made. However, such a matrix can become very large, such as when a population of millions of users is analyzed, so that the processing of the matrix consumes excessive time and computational resources.

SUMMARY

As described herein, techniques are provided for efficiently processing a matrix to provide recommendations to a user. In these techniques, a usage matrix is sampled so that it is reduced in size, where the reduced matrix can be factored using reduced computational resources. Subsequently, factor matrices of the usage matrix are obtained by dividing the computations among a set of computing devices, such as by using a map and reduce technique. An analytic, e.g., closed form, solution can be used by the computing devices to quickly arrive at a solution. The statistical significance of the solution remains high due to the statistical characteristics of the usage matrix, as long as the sample is sufficiently large and sufficiently representative of the set of all users.

In one approach, a computer-implemented method is provided in a recommendation system. The method includes sampling an initial usage matrix (R) to provide a reduced usage matrix (R', R"). The initial usage matrix R has factor matrices U and V according to the equation R=U×V, where it is desired to determine U and V with a minimum error and with efficient use of computational resources.

Entries in the initial usage matrix represent an interest by users in items such as movies, books, articles, or other products or services. Moreover, the users are represented by user vectors $\bar{u}$ R(i) (e.g., rows) in one dimension of the initial usage matrix and the items are represented by item vectors $\bar{v}$ R(j) (e.g., columns) in another dimension of the initial usage matrix. The sampling reduces the one dimension such that user vectors ($\bar{u}$ R'(i), $\bar{u}$ R"(i)) in the reduced usage matrix comprise a subset (some but not all) of the user vectors in the initial usage matrix R. For example, the sampling can select about 1-10% of the users so that the reduced usage matrix R' is about 1-10% the size of the initial usage matrix R. A subset refers to a proper subset (e.g., fewer than all users in a set).

The method further includes factoring the reduced usage matrix R' using iterative matrix factorization to provide a user matrix (U', U") (which is smaller than U) and an item matrix V (V, V") as factors of the reduced usage matrix.

The method further includes analytically determining the user matrix U as a factor of the initial usage matrix based on the item matrix and the initial usage matrix, where the item matrix is also a factor of the initial usage matrix. The analytically determining the user matrix U can be performed according to an equation UV=R+error, where the error is minimized and the item matrix V is fixed.

The method finally includes providing a recommendation to one of the users for one of the items using the user matrix and the item matrix which are factors of the initial usage matrix.

Optionally, the method includes sampling items in the initial usage matrix so that the reduced usage matrix comprises item vectors ($\bar{v}$ V"(j)) for a subset of the items, but not all of the items, in the initial usage matrix.

This makes the reduced usage matrix even smaller than when only the users are sampled, to expedite a matrix factorization which provides the user matrix U" and the item matrix V" which is smaller than V. The matrix V is subsequently obtained from U", V" and the remaining items which were not included in the sampling of the items.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

In the drawings, like-numbered elements correspond to one another.

FIG. 1B depicts example recommendations on the display 115 of the user computing device of FIG. 1A.

FIG. 7A depicts a process for obtaining a latent factor space for providing user recommendations based on a reduced usage matrix R'.

FIG. 7B depicts a flowchart of the process of FIG. 7A.

FIG. 8A depicts a process corresponding to FIGS. 7A and 7B, where R' is obtained from sampling users in R.

FIG. 8B depicts further details of creating the matrix R in step 800 in FIG. 8A.

FIG. 8C depicts further details of computing the item matrix V in step 806 in FIG. 8A.

FIG. 8D depicts further details of computing the user matrix U in step 810 in FIG. 8A.

FIG. 10A depicts an example of a reduced usage matrix R' which is obtained by sampling users vectors (rows) from R in FIG. 5A, in accordance with step 802 of FIG. 8A.

FIG. 10B depicts a user matrix U' which is a factor of the usage matrix R' of FIG. 10A and which comprises ten rows of user vectors and four columns of latent factor vectors, in accordance with step 806 of FIG. 8A.

FIG. 10C depicts factors of the user matrices R, R' and R".

FIG. 10D depicts an example of a reduced usage matrix R" which is obtained by sampling users vectors (rows) and item (columns) from R in FIG. 5A, in accordance with step 902 of FIG. 9A.

FIG. 10E depicts a user matrix U" which is a factor of the usage matrix R" of FIG. 10D and which comprises ten rows of user vectors and four columns of latent factor vectors, in accordance with step 906 of FIG. 9A.

FIG. 10F depicts a reduced item matrix V" which is a factor of the usage matrix R" of FIG. 10A and which comprises four rows of item factor vectors $\bar{F}$ V"(1) to $\bar{F}$ V"(4) and three columns of item vectors $\bar{v}$ V"(1), $\bar{v}$ V"(3) and $\bar{v}$ V"(5), in accordance with step 906 of FIG. 9A.

FIG. 10G depicts a mapping 1050 between GUIDs and indexes as discussed in connection with steps 804 and 808 of FIG. 8A and steps 904 and 908 of FIG. 9A.

DETAILED DESCRIPTION

As mentioned at the outset, factoring of a very large matrix can be computationally burdensome, consuming substantial processor resources, memory resources and network bandwidth. An example application of a very large matrix is a usage matrix in a recommendation system, where the matrix models a history of how users interact with items. However, the techniques provided herein are generally applicable to factoring matrixes for any purpose. The techniques provided herein provide computational efficiencies by sampling the usage matrix to provide a reduced usage matrix which is substantially reduced in size. The reduced usage matrix can be factored using a single dedicated server, for instance, having typical computational resources. Compared to a distributed computing approach, use of a single dedicated server reduces consumption of network bandwidth. Alternatively, the reduced usage matrix can be factored in a distributed computing approach which is less burdensome than would otherwise be the case. Subsequently, in a distributed computing approach, multiple computing devices can be used to divide up the task of computing the full usage matrix as a function of the factor matrices. These and other advantages will be apparent in view of the following discussion.

Figure 1A:
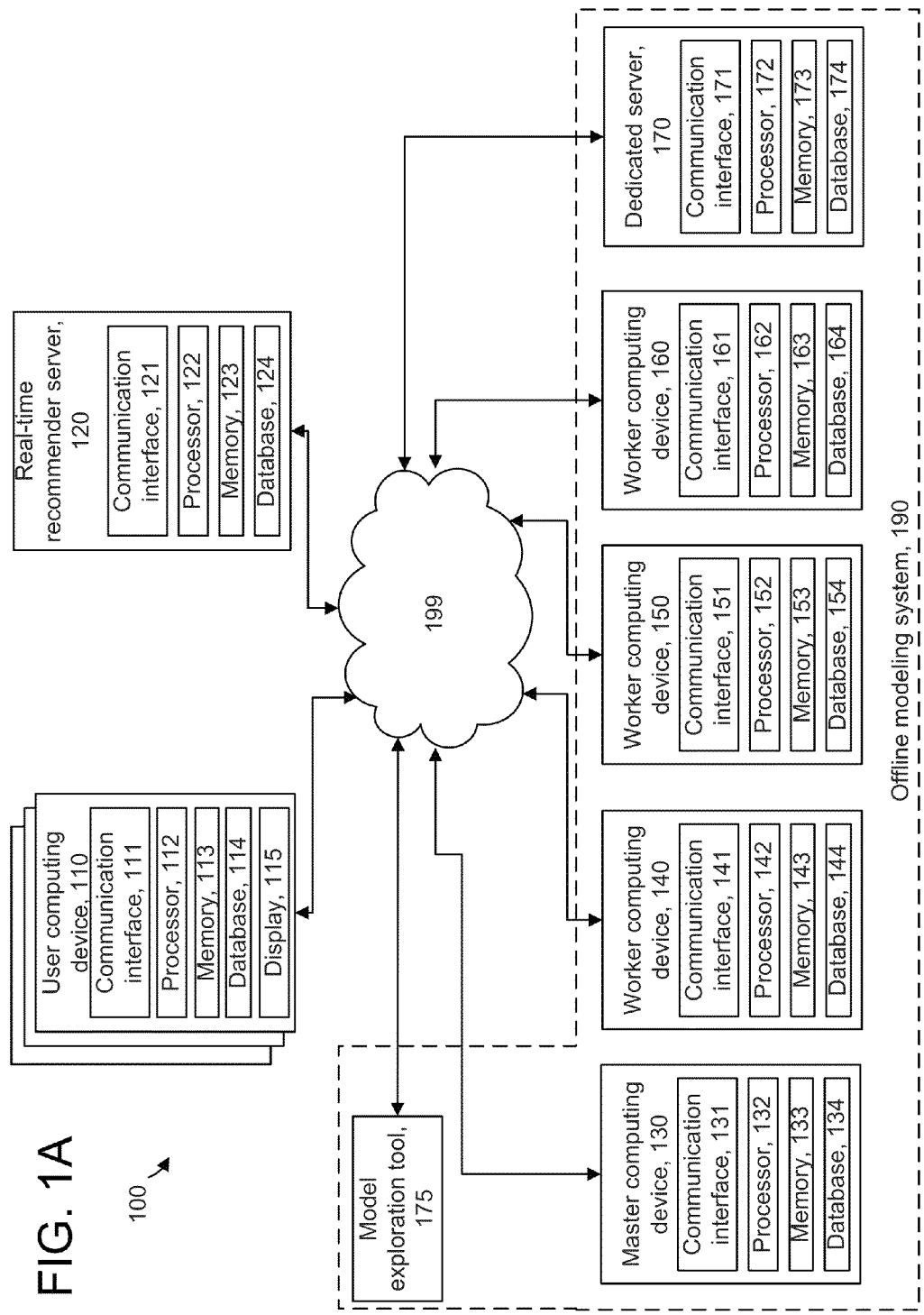
FIG. 1A depicts computing devices in a network 100.

FIG. 1A depicts computing devices in a network 100. The network includes a network communication medium 199 by which a number of computing devices can communicate with one another. For example, a master computing device 130, worker computing devices 140, 150 and 160 and a dedicated server 170 (also a computing device) are part of an offline modeling system 190.

A number of user computing devices, such as example user computing device 110, may represent client devices which communicate with a real-time recommender server 120 to obtain recommendations. The real-time recommender server may provide the recommendations. The user computing device 110 also includes a display which can display recommendations of items to a user. For example, see FIG. 1B. A model exploration tool 175 can also be provided on a separate computing device or as part of the master computing device to allow a human operator to test the models/matrices of the recommendation system. Further details of the real-time recommender server and the offline modeling system are provided, e.g., in FIG. 4. Each of the computing devices 110, 120, 130, 140, 150, 160 and 170 can include a respective communication interface 111, 121, 131, 141, 151, 161 and 171, a respective processor 112, 122, 132, 142, 152, 162 and 172, a respective memory 113, 123, 133, 143, 153, 163 and 173, and a respective database 114, 124, 134, 144, 154, 164 and 174.

In one approach, the offline modeling system performs matrix factorization on a very large set of data in the usage matrix. For example, popular web commerce operators may track several million users and thousands of items such as television programs or movies, and up to several millions of items such as music titles. Recommendations may be provided for movies, books, television programs, music, restaurants, recipes, or other products or services. The data in the matrix may be based on explicit feedback of the users such as ratings the users provide for the items, and/or implicit feedback such as data obtained by observing user behavior including purchase history, browsing history, search patterns and mouse/cursor movements. As an example, a user may provide a rating of one to five stars for a movie, where one star (lowest rating) is represented by the value one and five stars (highest rating) is represented by the value five in the usage matrix. The usage matrix can be updated periodically as new information is received from the users. The factorization can also be repeated periodically when it is desired to update the results.

Matrix factorization is an iterative process which computes vectors of the usage matrix for the items and the users. The matrix factorization is bi-linear: linear with respect to the users and linear with respect to the items. One approach to completing this task in a reasonable amount of time, e.g., a few hours, involves storing the entire set of data (both the usage, e.g., the feedback data from the users, as well as the vectors in the usage matrix) in the memory of a single computing device such as the dedicated server 170 if the single computing device has a very large memory, e.g., 150 GB or more. However, such a memory is expensive. Another approach to matrix factorization uses a map/reduce technique in which computations of the matrix factorization for the full usage matrix are performed on multiple computing devices/nodes. For example, the master computing device 130 may distribute the computations to the worker computing devices 140, 150 and 160. Three worker computing devices are shown as a simplified example. In practice, many more computing devices are used. However, this approach involves redistributing vectors which are computed by the worker computing devices after every iteration, making this solution slow and heavily dependent on communication bandwidth in the network. Moreover, most map/reduce systems are not geared to enable an iterative process like matrix factorization.

An architecture described herein combines a distributed computing environment (one example of which is a map/reduce environment) with a dedicated server which has a typical amount of memory, e.g., on the order of 32-48 GB. The matrix factorization can occur in two phases. In the first phase, an item matrix (also referred as an item model) is computed using an iterative matrix factorization implementation on the dedicated server from a sampled set of the usage. By using a sampled set of the usage (e.g., with sampling on the order of 1-10% of all users), it is sufficient to use a dedicated server with a relatively small amount of memory while still obtaining an accurate and fast result. In a second phase, the item model is brought back to the map/reduce environment and distributed to the worker computing devices, where an analytic solution is used to compute the user matrix (also referred to as a user model). Using an analytic solution to compute the user model from the item model becomes feasible in this two-phase approach. Moreover, an analytic solution takes advantage of the map/reduce environment to complete the user modeling in a fast and efficient way.

The percentage of the sampling can be a function of the number of users, where the percentage is higher when the number of users is lower, to provide a given level of statistical significance.

The combined architecture takes advantage of both the map/reduce architecture to sample the data and to compute the user model as well as the dedicated server to compute an item model using an iterative approach. This combined architecture increases significantly the speed of computing a matrix factorization model. An example comparison test resulted in reducing the compute time from 48 hours to 3 hours.

FIG. 1B depicts example recommendations on the display 115 of the user computing device of FIG. 1A. The display 115 includes an identifier of the user (Joe), a list of three recommended movies 105 (1. Suddenly, Last Summer, 2. Guess Who's Coming to Dinner?, 3. The Old Man and the Sea), and a message which informs the user to "Select a movie to view now or click here to view more recommendations." In this example, the movies exhibit factors such as: dramatic movies, movies from the 1950's and 1960's and movies featuring actors Spencer Tracy and Katherine Hepburn. Note that a recommendation can be provided via a computer user interface as in this example or by other means. A recommendation can be provided by a text message to a cell phone or other device. A recommendation can be provided in written form, e.g., by a letter mailed or faxed to a user.

Figure 2:
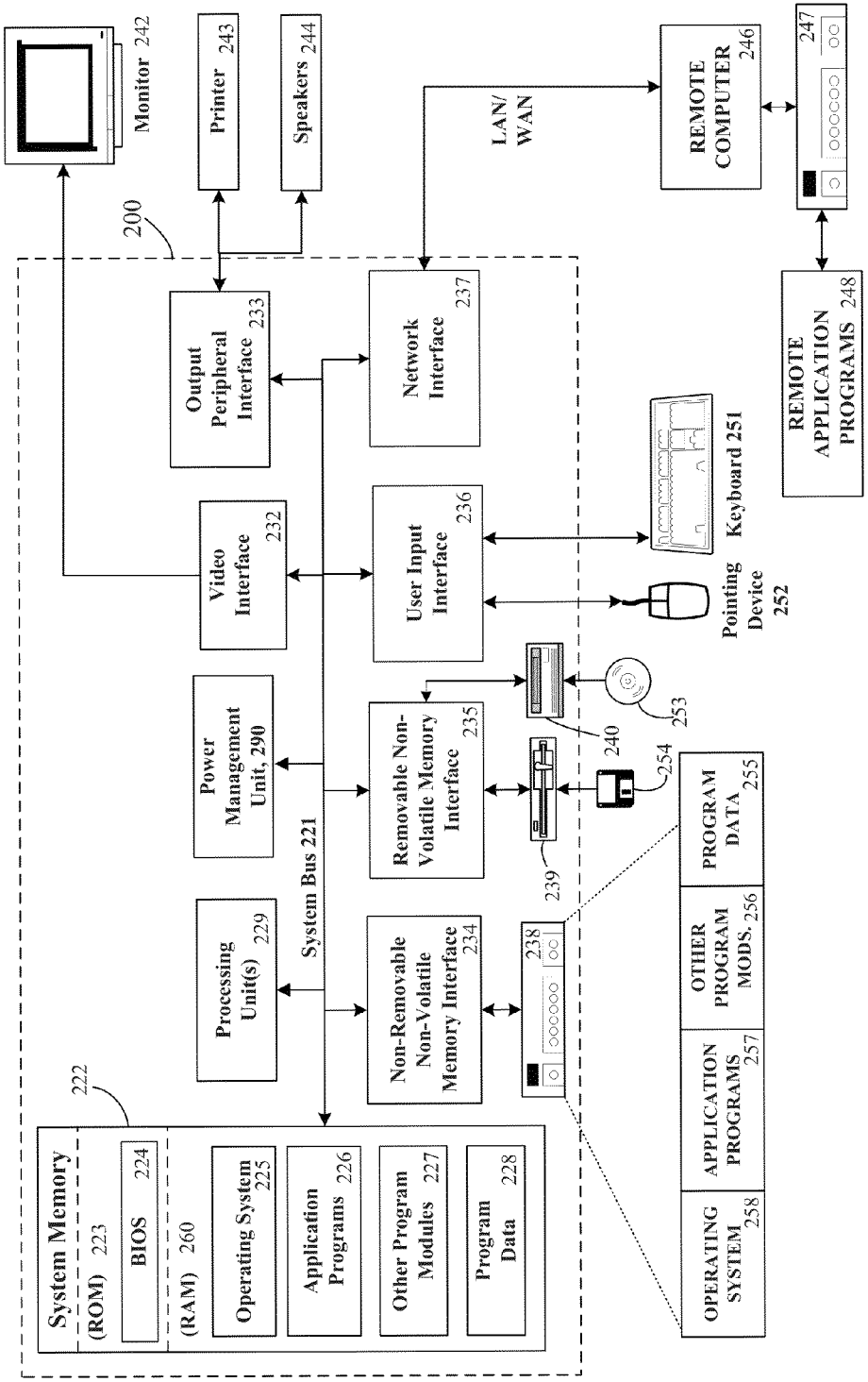
FIG. 2 is a block diagram of an example computing device 200 which may represent any of the computing devices of FIG. 1A.
Figure 3:
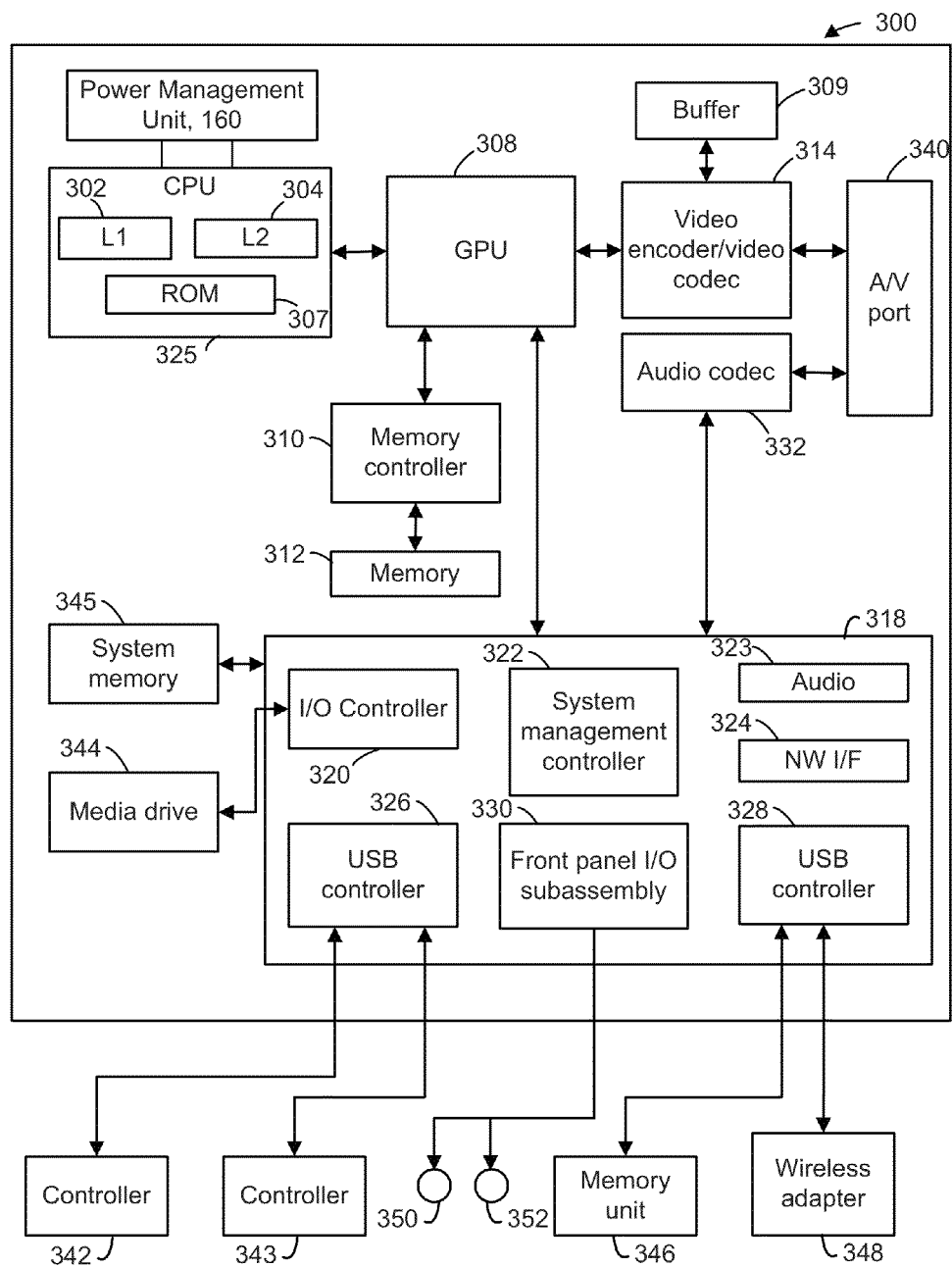
FIG. 3 is a block diagram of an example multimedia device 300 which may represent the user device 110 of FIG. 1A.

FIGS. 2 and 3, discussed next, provide example details of the computing devices of FIG. 1A.

FIG. 2 is a block diagram of an example computing device 200 which may represent any of the computing devices of FIG. 1A. The computing device 200 is one example of a suitable computing device and is not intended to suggest any limitation as to the scope of use or functionality of the presently disclosed subject matter. In some implementations the various depicted computing elements may include circuitry configured to instantiate specific aspects of the present disclosure. For example, the term circuitry used in the disclosure can include specialized hardware components configured to perform function(s) by firmware or switches. In other example implementations the term circuitry can include a general purpose processing unit, memory, etc., configured by software instructions that embody logic operable to perform function(s). In example implementations where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

The computing device 200 can include a variety of non-transitory, tangible computer- or processor-readable media or storage devices. The storage devices can represent any one of the memories 113, 123, 133, 143, 153, 163 and 173 of FIG. 1A. Further, one or more processors of the computing environment can provide a processor-implemented method comprising processor-implemented steps as described herein. A processor can represent any one of the processors 112, 122, 132, 142, 152, 162 and 172 of FIG. 1A.

Computer readable media can be any available media that can be accessed by computing device 200 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within the computer, such as during start-up, is typically stored in ROM 223. RAM 260 typically contains data and/or program modules that are immediately accessible to and/or presently being operated on by processing unit 229. By way of example, and not limitation, the figure illustrates operating system 225, application programs 226, other program modules 227, and program data 228.

The computing device may also include other removable/non-removable, volatile/nonvolatile computer storage media. For example, the figure illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media/devices that can be used in the exemplary operating environment include, but are not limited to, magnetic tape cassettes, flash memory cards, digital versatile disks, digital video tape, solid state RAM, solid state ROM, and the like. The hard disk drive is typically connected to the system bus 221 through a non-removable memory interface such as interface 234, and magnetic disk drive and optical disk drive are typically connected to the system bus 221 by a removable memory interface, such as interface 235.

The drives and their associated computer storage media discussed above and illustrated in the figure provide storage of computer- or processor-readable instructions, data structures, program modules and other data for the computing device. For example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computing device through input devices such as a keyboard 251 and pointing device 252, commonly referred to as a mouse, trackball or touch pad. Other input devices (not shown) may include a microphone (voice control), joystick, game pad, satellite dish, scanner, a motion sensor (gesture control), or the like. These and other input devices are often connected to the processing unit 229 through a user input interface 236 that is coupled to the system bus, but may be connected by other interface and bus structures, such as a parallel port, game port or a universal serial bus (USB). A motion detection camera and capture device may define additional input devices that connect via user input interface 236. A monitor 242 or other type of display device is also connected to the system bus 221 via an interface, such as a video interface 232. In addition to the monitor, the computing device may also include other peripheral output devices such as speakers 244 and printer 243, which may be connected through an output peripheral interface 233.

The computing device may operate in a networked environment using logical connections to one or more remote computers, such as a remote computer 246. The remote computer 246 may be a personal computer, a game console, a server, a router, a network PC, a peer device or other common network node, and typically includes many or all of the elements described above relative to the computing device, although a memory storage device 247 has been illustrated. The logical connections depicted include a local area network (LAN) and a wide area network (WAN), but may also include other networks. Such networking environments are commonplace in offices, enterprise-wide computer networks, intranets and the Internet.

When used in a LAN or WAN networking environment, the computing device is connected to the LAN or WAN through a network interface or adapter 237. The network interface or adapter 237 can represent any of the communication interfaces 111, 121, 131, 141, 151, 161 and 171 of FIG. 1A.

In a networked environment, program modules depicted relative to the computing device, or portions thereof, may be stored in the remote memory storage device. Application programs 248 may reside on memory device 247, for example. It will be appreciated that the network connections shown are exemplary and other means of establishing a communications link between computing platforms may be used.

FIG. 3 is a block diagram of an example multimedia device 300 which may represent the user device 110 of FIG. 1A. The multimedia device may be a gaming console with Internet connectivity, for instance, and is used to obtain feedback from a user regarding the user's level of interest in various items.

A central processing unit (CPU) 325 has a level 1 (L1) cache 302, a level 2 (L2) cache 304, and a flash ROM (Read Only Memory) 307. The L1 cache and L2 cache temporarily store data and hence reduce the number of memory access cycles, thereby improving processing speed and throughput. The CPU 325 may have more than one core, and thus, additional level 1 and level 2 caches 302 and 304. The flash ROM 307 may store executable code that is loaded during an initial phase of a boot process when the multimedia console is powered on.

A graphics processing unit (GPU) 308 and a video encoder/video codec (coder/decoder) 314 form a video processing pipeline for high speed and high resolution graphics processing. The coder/decoder may access a buffer 309 for buffering frames of video. Data is carried from the GPU to the coder/decoder via a bus. The video processing pipeline outputs data to an A/V (audio/video) port 340 for transmission to a television or other display. A memory controller 310 is connected to the GPU to facilitate processor access to various types of memory 312, such as RAM.

The multimedia console includes an I/O controller 320, a system management controller 322, an audio processing unit 323, a network interface 324, a first USB host controller 326, a second USB controller 328 and a front panel I/O subassembly 330 that are preferably implemented on a module 318. The USB controllers 326 and 328 serve as hosts for peripheral controllers 342 and 343, such as game controllers, a wireless adapter 348, and an external memory unit 346 (e.g., flash memory, external CD/DVD ROM drive, removable media, etc.) The network interface (NW IF) 324 and/or wireless adapter 348 provide access to a network (e.g., the Internet, home network, etc.) and may include wired or wireless adapter components including an Ethernet card, a modem, a Bluetooth module, a cable modem, and the like. The network interface may represent the communication interface 111 of FIG. 1A.

System memory 345 is provided to store application data that is loaded during the boot process. A media drive 344 may comprise a DVD/CD drive, hard drive, or other removable media drive. The media drive 344 may be internal or external to the multimedia console. Application data may be accessed via the media drive 344 for execution, playback, etc. by the multimedia console. The media drive 344 is connected to the I/O controller 320 via a bus, such as a Serial ATA bus or other high speed connection.

The system management controller 322 provides a variety of service functions related to assuring availability of the multimedia console. The audio processing unit 323 and an audio codec 332 form an audio processing pipeline with high fidelity and stereo processing. Audio data is carried between the audio processing unit 323 and the audio codec 332 via a communication link. The audio processing pipeline outputs data to the A/V port 340 for reproduction by an external audio player or device having audio capabilities.

The front panel I/O subassembly 330 supports the functionality of the power button 350 and the eject button 352, as well as any LEDs (light emitting diodes) or other indicators exposed on the outer surface of the multimedia console. A power management unit 290 provides power to the components of the multimedia console.

The CPU, GPU, memory controller, and various other components within the multimedia console are interconnected via one or more buses, including serial and parallel buses, a memory bus, a peripheral bus, and a processor or local bus using any of a variety of bus architectures.

When the multimedia console is powered on, application data may be loaded from the system memory 345 into memory 312 and/or caches 302, 304 and executed on the CPU. The application may present a graphical user interface that provides a consistent user experience when navigating to different media types available on the multimedia console. In operation, applications and/or other media contained within the media drive 344 may be launched or played from the media drive 344 to provide additional functionalities to the multimedia console.

The multimedia console may be operated as a standalone system by simply connecting the system to a television or other display. In this standalone mode, the multimedia console allows one or more users to interact with the system, watch movies, or listen to music. However, with the integration of broadband connectivity made available through the network interface 324 or the wireless adapter 348, the multimedia console may further be operated as a participant in a larger network community.

Input devices (e.g., controllers 342 and 343) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches.

The computing environment can include non-transitory, tangible computer- or processor-readable storage devices having computer readable software or code embodied thereon which is executed by at least one processor to perform methods as described herein. The storage devices can include, e.g., one or more of components 302, 304, 306, 312, 345 and 346. The storage devices can represent the memory 113 of FIG. 1A. Further, one or more processors of the computing environment can provide a processor-implemented method comprising processor-implemented steps as described herein. A processor can include, e.g., one or more of CPU 325 and memory controller 310. The processor can represent the processor 112 of FIG. 1A.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Figure 4:
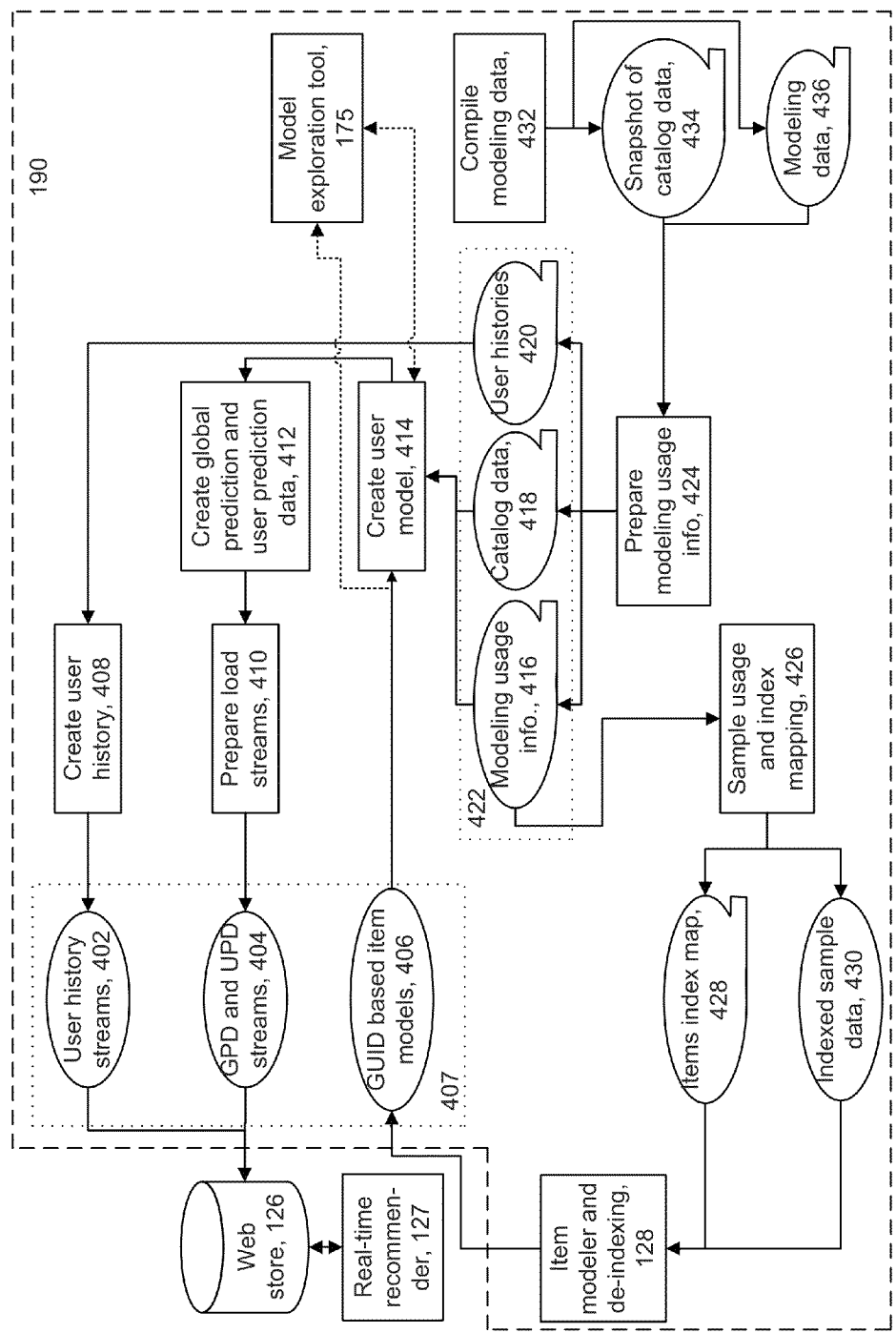
FIG. 4 depicts further details of the network 100 of FIG. 1A.

FIG. 4 depicts further details of the network 100 of FIG. 1A. The techniques provided herein include computing a matrix factorization item model (V) on a sampled set of usage data (R' or R") using an iterative matrix factorization solution on a dedicated server with a reasonable amount of memory, and computing a matrix factorization user model (U) from the item model (V) on the full set of usage data using an analytic matrix factorization solution in a map/reduce environment. Further details of these matrices are provided in connection with subsequent figures.

The diagram includes both hardware and software. The web store 126 (hardware) stores the entire model (e.g., the computed matrices) and may be provided in the real-time recommender server 120 of FIG. 1A. An item modeler and de-indexing function process 128 (software), which may be provided in the dedicated server 170 of FIG. 1A, performs a matrix factorization for a sampled matrix R'. The web store can be used by a run time system such as the real-time recommender process (software) 127 to compute recommendations and send them to a user. The real-time recommender process, which may be provided in the real-time recommender server 120 of FIG. 1A, computes the recommendations from the model stored in the web store and sends them to the users.

The remaining components/processes in FIG. 4, which are within the dashed line box, can be considered to be part of the offline modeling system 190 of FIG. 1A, in one possible implementation. The compile modeling data process 432 takes explicit and/or implicit signals and compiles them as modeling data. These signals are translated into entries in a matrix R which provides information about what a person likes or does not like. Ratings can be provided explicitly or by translating the purchase or the play and the starts and stops into either a "like" or "does not like" indication or into a five star rating, for example. That information is stored as modeling data 436 (software and hardware). The compile modeling data process also takes a snapshot of catalog data 434 (software and hardware), which includes a list of all the items involved in a recommendation system. Since the catalog is dynamic, a list is obtained of the items on which the item model is computed. This is one way to compute the entry to the system.

To the left of these blocks is the generic modeling system. One concern is to prepare modeling usage information 424 (software). The previously-mentioned signals and user histories from a create user histories process 420 (hardware and software) are copied for later use. The histories indicate what items, e.g., movies, a user has already seen so that the same item is not recommended again. A create user history process 408 (software) provides user history streams 402 (software) for storage in the web store. A copy is made of the catalog data 418 (hardware and software) and of the modeling usage information 416 (hardware and software) that is already known, such as from previous computations. These three items are grouped in a box 422 which indicates they are associated with a same version of data, and these items provide a record of the information that is being used in the system.

A sample usage and index mapping process 426 (software) is used to perform sampling from a large usage matrix R to provide a reduced matrix R', and to perform associated index mapping. The items and users can be identified by GUIDs (global identifiers) which are long enough to allow distinguishing millions of users and items, for instance. However, due to the sampling, the number of users and items to distinguish is reduced, so a smaller field such as the matrix row or column index can be used. The memory capacity in the item modeler and de-indexing process 128 (software) to store the fields can be reduced by providing a mapping from the GUIDs to a matrix index. This mapping is represented by an items index map 428 (software). The reduced matrix R' is represented by the indexed sample data 430 (software).

This items index map and the indexed sample data are uploaded to the item modeler and de-indexing process. The item modeler runs and computes the items and sends the item matrix/model V back to the offline modeling system 190, as represented by the GUID based item models process 406 (software). The indexes are converted back to the original GUIDs so that they can be correlated with the stored usage data.

A create user model process 414 (software) performs a map and reduce process by taking the item matrix and sending it to many nodes/computing devices. Each node uses the relevant usage information for the users that it is going to compute and it computes the vectors for those users using the analytic process. All the users are then aggregated together in a reduce step. A create global prediction and user prediction data process 412 (software) converts a generic modeling format to whatever format the runtime system is expecting, e.g., by scaling and removing items that may not provide good results and performing other types of post processing. The data is then provided to a prepare load stream process 410 (software) which can prepare the data to be loaded into the web store 126. Global prediction data (GPD) and user prediction data (UPD) streams 404 (software) represent an engineering package which provides formatting of the streams.

The user history streams 402, GPD and UPD streams 404 and the GUID based item models process 406 are grouped in a box 407 which indicates they are associated with a same version of data.

The model exploration tool 175 allows researchers to look at the output of the item modeler and the output of the user model and perform experiments.

The usage matrix R can be computed once a day or whenever it is desired to update the matrix. When a user device calls the system, the latest version of the computed model can be used to provide a recommendation. In addition to recommendations, there are a number of other applications for which the techniques herein can be used. The techniques can be applied in various scenarios where matrix factorization occurs. For example, such scenarios can involve counting the number of words on a web page or matching source and destination network addresses for web pages.

Figure 5:
FIG. 5A depicts an example usage matrix R=U×V which comprises 600 rows of user vectors and five columns of item vectors.
FIG. 5B depicts a user matrix U (a factor matrix of R) which comprises 600 rows of user vectors and four columns of latent factor vectors.
FIG. 5C depicts an item matrix V (a factor matrix of R) which comprises four rows of latent factor vectors and five columns of item vectors.

FIG. 5A depicts an example usage matrix R=U×V which comprises 600 rows of user vectors and five columns of item vectors. The following vectors and matrices are defined. An index "i" represents a row vector and an index "j" represents a column vector.

$\bar{v}$ R(j)=jth item vector in an initial usage matrix R (R=U×V);

$\bar{v}$ R'(j)=jth item vector in a user-reduced usage matrix R' (e.g., R sampled by user, where R'=U'×V');

$\bar{v}$ R"(j)=jth item vector in a user- and item-reduced usage matrix R" (e.g., R' sampled by item, where R"=U"×V");

$\bar{v}$ V(j)=jth item vector in an item matrix V;

$\bar{v}$ V"(j)=jth item vector in an item matrix V";

$\bar{u}$ R(i)=ith user vector in R;

$\bar{u}$ R'(i)=ith user vector in R';

$\bar{u}$ R"(i)=ith user vector in R";

$\bar{u}$ U(i)=ith user vector in a user matrix U;

$\bar{u}$ U'(i)=ith user vector in a user matrix U';

$\bar{u}$ U"(i)=ith user vector in a user matrix U";

$\bar{F}$ U(j)=user factor vector in a user matrix U;

$\bar{F}$ U'(j)=user factor vector in a user matrix U';

$\bar{F}$ U"(j)=user factor vector in a user matrix U";

$\bar{F}$ V(i)=item factor vector in an item matrix V; and $\bar{F}$ V"(i)=item factor vector in an item matrix V".

Generally, in R, there are m rows of users vectors $\bar{u}$ R(1) to $\bar{u}$ R(m) and n columns of item vectors $\bar{v}$ R(1) to $\bar{v}$ R(n). The matrix entries for the first row of $\bar{u}$ R(1) are r(1,1,) to r(1,n) and the matrix entries for the last row of $\bar{u}$ R(m) are r(m,1) to r(m,n). Typically, the usage matrix is very sparse, e.g., about 90-99% sparse, because any given user will have rated a small subset of all available items.

As a simplified example, the matrix R depicted has m=600 user vectors of $\bar{u}$ R(1) to $\bar{u}$ R(600) and five item vectors $\bar{v}$ R(1) to $\bar{v}$ R(5). As mentioned, in practice, there could be many more, e.g., millions, of rows and many subsets of rows. Further, the user vectors are divided into example subsets 510, 512 and 514 which are processed separately to solve for a corresponding subset of U as described below, e.g., in connection with FIGS. 8D and 9C. Subset 510 includes vectors $\bar{u}$ R(1) to $\bar{u}$ R(200), subset 512 includes vectors $\bar{u}$ R(201) to $\bar{u}$ R(400) and subset 514 includes vectors $\bar{u}$ R(401) to $\bar{u}$ R(600). The matrix entries for the first vectors of $\bar{u}$ R(1) are r(1,1) to r(1,5) and the matrix entries for the last vectors of $\bar{u}$ R(600) are r(600,1) to r(600,5).

FIG. 5B depicts a user matrix U (a factor matrix of R) which comprises 600 rows of user vectors and four columns of latent factor vectors. The matrix U has m=600 user vectors $\bar{u}$ U(1) to $\bar{u}$ U(600), and four user factor vectors of $\bar{F}$ U(1) to $\bar{F}$ U(4). The matrix entries for the first vector of $\bar{u}$ U(1) are u(1,1) to u(1,4) and the matrix entries for the last vector of $\bar{u}$ U(600) are u(600,1) to u(600,4). The row dimension of both R and U is m. Generally, U has a size of m rows×p columns. In this example, m=600 and p=4. The subsets 520, 522 and 524 correspond to the same users in the subsets 510, 512 and 514, respectively.

FIG. 5C depicts an item matrix V (a factor matrix of R) which comprises four rows of latent factor vectors and five columns of item vectors. The matrix V has four item factor vectors $\bar{F}$ V(1) to $\bar{F}$ V(4), and five item vectors $\bar{v}$ V(1) to $\bar{v}$ V(5). The matrix entries for the first vector of $\bar{F}$ V(1) are v(1,1) to v(1,5) and the matrix entries for the last vector of $\bar{F}$ V(4) are v(4,1) to v(4,5). Generally, V has a size of p rows×n columns. In this example, p=4 and n=5. p is the column dimension, indicating a number of latent factors in a latent factor space.

The user matrix U and the item matrix V represent a mapping of the users and items to a joint latent factor space of dimensionality f such that user-item interactions are modeled as inner (dot) products in this space. A given user vector $\bar{u}$ U(i) represents the user's preference for each of the factors, or traits, associated with the user factor vectors $\bar{F}$ U(1) to $\bar{F}$ U(4). For example, the entry u(1,1) represents the user's preference for, or interest in, the factor of $\bar{F}$ U(1). Similarly, a given item vector $\bar{v}$ V(j) represents the extent to which an item exhibits a factor associated with each of the item factor vectors $\bar{F}$ V(1) to $\bar{F}$ V(4). For example, the entry v(1,1) represents the extent to which an item represented by the item vector $\bar{v}$ V(1) exhibits the factor of $\bar{F}$ V(1). $\bar{F}$ U(1) and $\bar{F}$ V(1) are associated with a first factor, $\bar{F}$ U(2) and $\bar{F}$ V(2) are associated with a second factor, $\bar{F}$ U(3) and $\bar{F}$ V(3) are associated with a third factor, and $\bar{F}$ U(4) and $\bar{F}$ V(4) are associated with a fourth factor. The factors are typically not observed but are inferred from R using mathematical techniques. In an example where the items are movies, the factors can encompass criteria such as whether a user prefers old films, certain actors, certain genres and so forth, but, again, the factors are latent—present but not visible. In this scenario, the number of factors (p) can be, e.g., 10-100. The number of factors can be set by the designer.

The magnitude of a dot product of a user vector $\bar{u}$ U(i) in U with an item vector $\bar{v}$ V(j) in V indicates a degree of interest by the user associated with that user vector in an item associated with that item vector. See also FIG. 6. For example, the degree of interest of the user $\bar{u}$ U(1) in the item of $\bar{v}$ V(1) is the dot product of $\bar{u}$ U(1) and $\bar{v}$ V(1), namely: u(1,1)×v(1,1)+u(1,2)×v(2,1)+u(1,3)×v(3,1)+u(1,4)×v(4,1). The degree of interest of the user $\bar{u}$ U(1) in each of the items of $\bar{v}$ V(1) to $\bar{v}$ V(n) can therefore be determined. The degrees of interest can then be ranked and a recommendation of an item made based on the highest degree of interest. The recommendation can be adjusted based on various considerations, e.g., so that items which the user has already selected are not recommended, or so that items which were previously recommended a number of times but not selected by the user are not recommended.

The user feature vectors and item feature vectors are determined so that R is approximated by U×V. This is a mathematical problem of matrix decomposition of R. Solving for U and V essentially results in solving for missing entries in R to allow recommendations to be made for items which a user has not rated or provided feedback on. The factor vectors are learned by training them on the known ratings in R, minimizing errors between the known ratings and predicted ratings. For example, a least squares error may be minimized. In one approach, the ratings in R are normalized by subtracting the global mean of the ratings. Next, a factorization model with a cost function is used to learn the user and item factor vectors. Item biases and user biases can also be learned. Regularization can be performed to prevent model over fitting. The optimal factor vectors can be obtained by minimizing the cost function analytically or incorporating an algorithm such as stochastic gradient descent over multiple such iterations. For example, each alternating step of Alternating Least Squares is a special case of finding an analytic minimum under a squared error cost function. Finally, the matrix factorization can be tuned by setting the number of factors in the factor vectors among other considerations.

The example matrices of FIGS. 5A to 5C will be used in the following discussions.

Generally, each entry of the user and/or item matrices can be multi-valued, having multiple numbers or values, such as a distribution on a number, rather than being single-valued, having a single number or value. For example, each entry can include a first number which is an expected value of the entry and a second number which indicates a certainty associated with the expected value. Such an entry can be viewed as a distribution, for example, a Gaussian/Normal distribution. For example, the entry u(200,2) in FIG. 5B can represent a normal distribution which is characterized by a mean and a variance, e.g., u(200,2)~Normal(mean(200,2), variance(200, 2)). The mean is the first number and the variance is the second number. Alternatively, each entry of the user and item matrices is a number with no associated certainty. For example, u(200,2)~Normal(mean(200,2), 0). Each entry can include other information as well, such as an indication of how a change in one user's preferences will affect another user's preferences. These types of correlations can be learned. The term "entry" or the like thus can represent one value or multiple values.

Figure 6:
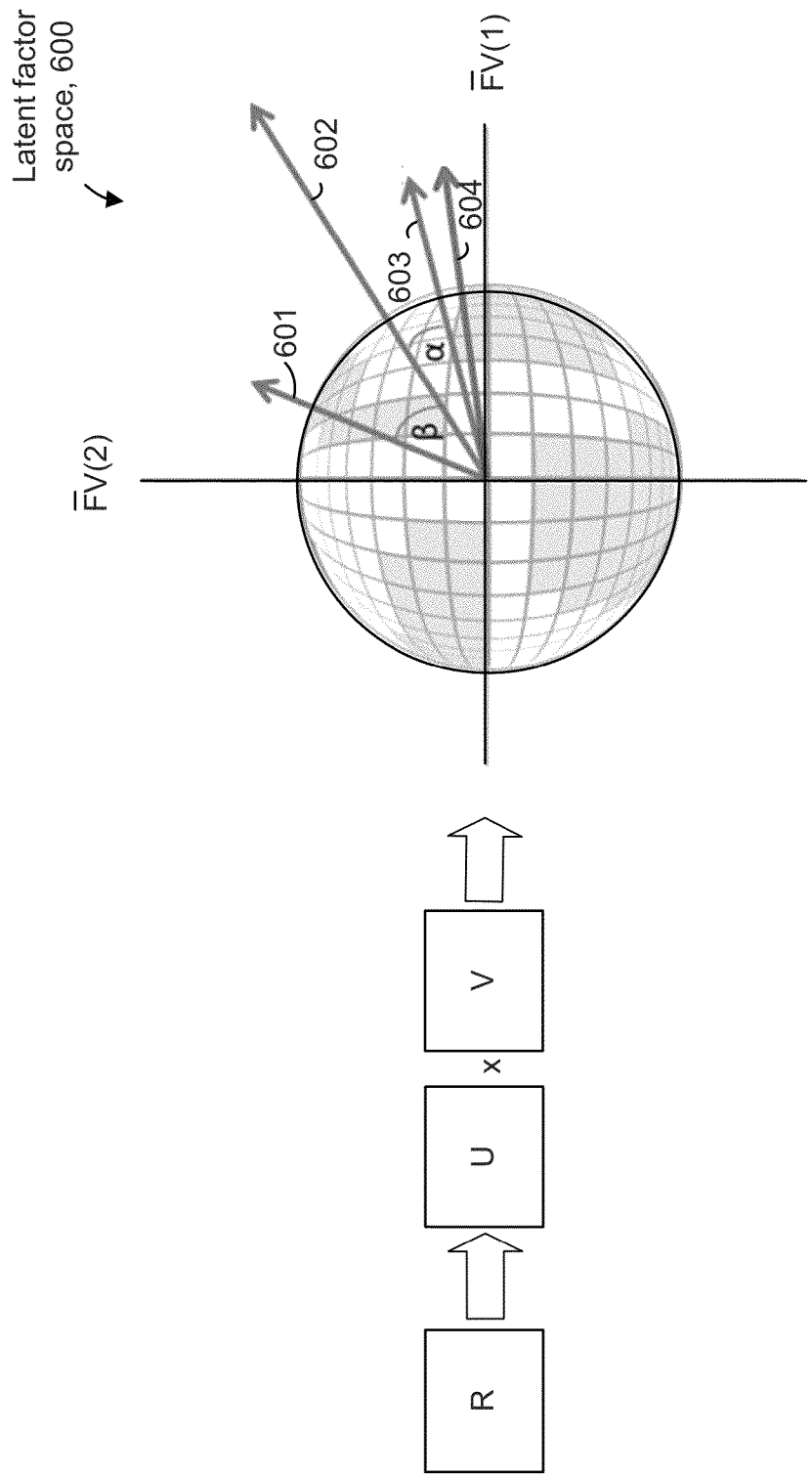
FIG. 6 depicts a process for obtaining a latent factor space for providing user recommendations based on an initial usage matrix R which is factored into a user matrix U and an item matrix V.

FIG. 6 depicts a process for obtaining a latent factor space for providing user recommendations based on an initial usage matrix R which is factored into a user matrix U and an item matrix V. As mentioned, the magnitude of a dot product of a user vector in U with an item vector in V indicates a degree of interest by the user associated with that user vector in an item associated with that item vector. The joint latent factor space 600 depicts a horizontal axis which represents a factor associated with one item factor vector such as $\bar{F}$ V(1) and the vertical axis represents a factor associated with another item factor vector such as $\bar{F}$ V(2). This is a simplified two-dimensional space (f=2). In practice, a higher dimensionality can be used. The vectors 601, 602, 603 and 604 represent respective items, and the angle of the vector is based on the relative magnitudes of the degree to which the item exhibits the factors. For example, the item associated with vector 602 exhibits the factors most strongly relative to other items because that is the longest vector. The dimension f of the latent factor space can be set at a level which is expected to yield statistically good results. Testing can be performed to obtain an optimal f.

FIG. 7A depicts a process for obtaining a latent factor space for providing user recommendations based on a reduced usage matrix R'. In this approach, the usage matrix R is sampled to provide a reduced usage matrix R', and a map and reduce process is used to obtain the user matrix U. The arrows 700 represent mapping of tasks to the worker computing devices 140, 150, 160, . . . and the arrows 702 represent reducing an output of the worker computing devices to obtain the latent factor space 710.

FIG. 7B depicts a flowchart of the process of FIG. 7A. The steps include: gather and store usage information of users relative to items, 750; select a sample of the users, 752; factor a matrix of the usage information for the sample into a user model and an item model at a dedicated server, 754; obtain the user model for all users using map and reduce at different worker computing devices, where each computing device obtains a subset of the user model, 756; and provide a recommendation based on the user model for all users and the item model, 758. Further details of step 750 are provided, e.g., in step 800 of FIG. 8A and in step 900 of FIG. 9A. Further details of step 752 are provided, e.g., in step 802 of FIG. 8A and in step 902 of FIG. 9A. Further details of step 754 are provided, e.g., in steps 804 and 806 of FIG. 8A and in steps 904 and 906 of FIG. 9A. Further details of step 756 are provided, e.g., in steps 808 and 810 of FIG. 8A and in steps 908 and 910 of FIG. 9A. Further details of step 758 are provided, e.g., in step 812 of FIG. 8A and in step 912 of FIG. 9A.

Generally, this approach can involve computing the item matrix by parallel iterative matrix factorization on a single server which can have a relatively small memory capacity, e.g., less than 48 GB. Next, the user matrix is efficiently computed from the item matrix using map and reduce or another distributing computing process in an analytic solution. The item matrix V has a high statistical significance even though it is determined from a sample of the usage matrix R because the row dimension of R is much larger than its column dimension.

FIG. 8A depicts a process corresponding to FIGS. 7A and 7B, where R' is obtained from sampling users in R. The steps include: create initial usage matrix R at master computing device, 800 (see FIG. 8B); sample user vectors in the initial usage matrix R to provide a reduced usage matrix R', 802; upload reduced usage matrix R' to dedicated server; map GUIDs to indexes (see FIG. 10G), 804; compute an item matrix V using iterative matrix factorization (MF), where R'=U'×V, 806 (see FIG. 8C); return the item matrix V to the master computing device; map indexes to GUIDs, 808; compute a user matrix U using the item matrix V in an analytic matrix factorization solution, 810 (see FIG. 8D); and load user matrix, item matrix and user history into online recommendation system, 812.

In an example implementation, the master computing device 130 of FIG. 1A performs steps 800 and 802, and the dedicated server 170 of FIG. 1A performs steps 806 and 808. However, this is an example only as the computing resources of one or more computing devices can be used. For example, the master computing device could perform the functions of the dedicated server in which case it does not upload R' but processes it locally. Or, R' can be uploaded to an additional computing device not shown in FIG. 1A. The recommendation model server 120 can be part of the online recommendation system of step 812. Generally, it can be advisable to perform most of the processing in the offline modeling system to avoid interrupting the online servers. Further details of the steps are discussed below.

In one approach, the item matrix V is calculated on a single computing device so that communications among different computing devices in a network are avoided.

The creation of the initial usage matrix is an initial step in which explicit data for the usage matrix such as a "like/does-not-like" rating (or multiple star rating) are obtained directly and/or derived from implicit signals such as presence, play time, start and stop events, use-count, purchase information and so forth. This can be done efficiently in the offline modeling system 190.

The sampling of the usage data can ensure that the resulting sample is small enough to fit the memory of the dedicated server while still containing a good statistical representation of the full usage matrix. As mentioned sampling of about 1-10% of users can be used. The sampling can be random, or every xth user can be selected, for instance.

Regarding step 808, the GUIDs are global identifiers which are assigned to users and items. For example, a GUID can be represented by a significant amount of data such as a ten byte or eighty bit number. To reduce the amount of data which is communicated and stored (such as in the item modeler of FIG. 4 in the dedicated server), the GUIDs for the users and items can be replaced by sequential indexes, e.g., 1, 2, 3, . . . which can be represented by a shorter bit length. The bit length can be shorter for the index because the index indicates the relative position of a user vector (or item vector) in matrix rather than identifying a particular user/item from a global pool of users/items.

A mapping from GUID to index can thus be provided for the users and/or items. The sampled usage data in R' or R" can therefore use the indexes instead of GUIDs to provide a more compressed matrix.

Regarding step 812, the user matrix and the item matrix can be partitioned to allow efficient loading into a runtime system, e.g., at the recommendation model server 120. The user history can be computed from the usage matrix and partitioned as well. The computed user matrix, item matrix and user history are loaded to the runtime recommendation system.

FIG. 8B depicts further details of creating the matrix R in step 800 in FIG. 8A. The steps include: obtain explicit and/or explicit feedback from users, 820; obtain other information regarding users, 822 (e.g., demographic information, other preferences provided by users); determine level of interest of users in items, 824 (e.g., by processing the feedback and other information); and provide R from level of interest in items for each user, 826. In one scenario, as discussed, R comprises ratings which are directly provided by the users.

FIG. 8C depicts further details of computing the item matrix V in step 806 in FIG. 8A. This process has a relatively low computational burden and can therefore be done using modest computational resources such as the computational resources of a single computing device, in one possible approach. The steps include: initialize user vectors in U' and item vectors in V to initial values, 840 (the sampled usage data as well as the user and item vectors are kept in memory); fix the item vectors in V, compute an error for each user vector in U', and update these user vectors (e.g., according to an update rule for U'), 842; and fix the user vectors in U', compute an error for each item vector in V, and update these item vectors (e.g., according to an update rule for V'), 844. A decision step 846 determines if there is a convergence of the iterations based on a convergence criterion. For example, a convergence may be declared if the errors of steps 842 and 844 are below respective threshold error levels. If decision step 846 is true, step 848 indicates that an optimal user matrix U' and item matrix V are obtained. If decision step 846 is false, another iteration of steps 842 and 844 occurs. Note that the order of steps 842 and 844 can be reversed.

The error for each of the user vectors of the user matrix which is a factor of the reduced usage matrix can be computed according to $U'=R'V^T(VV^T)^{-1}$, for instance, where U' is the user matrix which is a factor of the reduced usage matrix, R' is the reduced usage matrix and V is the item matrix. This equation provides an updated U' in the steps where an update of user vectors is computed (steps 842 and 942). This equation can be considered to implement a basic update rule in the case of real values R(i,j) in R, when the error is defined according to a squared error loss. Thus, this is an example of an update rule for U' which minimizes a squared error, a type of error metric. Generally, an update rule can minimize an error metric.

However, other error definitions can be used in which case the details of the update rule can also change. Moreover, the type of signal represented by R(i,j) can vary. As mentioned, R can represent, e.g., a star-rating scale, a binary (like or dislike) value, or a mixture of derived implicit and explicit signals. Therefore, the computation of U' can take a different form depending on the type of signal in R. In one approach, each value of an entry (e.g., mean, variance) is subject to the update rule. Thus, step 842 can subject each value of an entry in U' to a respective update rule, and step 844 can subject each value of an entry in V' to a respective update rule.

Regardless of the type of entry in R(i,j), one can derive a variant of the basic update rule as an update rule which works on $\bar{u}$ U(i) in parallel, so that each row $\bar{u}$ U(i) in FIG. 5B can be updated in parallel, the update is analytical according to $\bar{v}$ V(j) from FIG. 5C, and the update rule sets U' to analytically minimize the chosen error metric. Moreover, when each entry of the user and/or item matrices is multi-valued, as discussed above, the update rule can be applied for each value (e.g., for both the mean and a variance/uncertainty estimate).

Further, the error for each of the item vectors of the item matrix can be computed according to $V=R'U'^T(U'U'^T)^{-1}$, for instance, where V is the item matrix, U' is the user matrix which is a factor of the reduced usage matrix and R' is the reduced usage matrix. This is an example of an update rule for V which minimizes a squared error.

Regarding the update of user vectors in steps 842 and 844, in one approach, with U'V=R' and V and R' known, the user vectors U' can be obtained analytically from the above-mentioned update rule for U'. Thus, an error for each of the user vectors $\bar{u}$ U'(i) of the user matrix U' can be computed according to the update rule. Similarly, the error for each of the item vectors $\bar{v}$ V(j) of the item matrix V can be computed according to the above-mentioned update rule for V. In practice, the update may include additional considerations and may be parallelized across user vectors. Moreover, the "single user" version of this equation can be used in the map and reduce process of FIG. 8D. The item vectors are thus analytically found from the user vectors, and the user vectors are analytically found from the item vectors. After each update, the data fit is improved. At convergence of this process, an optimal data fit as defined by the error metric is achieved: the data (usage) matrix is factorized. After convergence, the analytic step is repeated once in step 854 of FIG. 8D to fit all user vectors in parallel. Note that the item model V would not have been statistically different if the full usage matrix R had been modeled because the matrix R is "long and narrow," with a few orders of magnitude, or at least two orders of magnitude, more users than items.

FIG. 8D depicts further details of computing the user matrix U in step 810 in FIG. 8A. This process has a relatively high computational burden and can therefore be done using distributed computational resources, in one possible approach. The steps include: distribute the item matrix V (e.g., as a resource file) to multiple worker computing devices (such as computing devices 140, 150 and 160 in FIG. 1A), 850; distribute different subsets of user vectors in R to different worker computing devices using a map and reduce process (such as subsets 510, 512 and 514 in FIG. 5A), 852; and for a fixed item matrix V, analytically compute user vectors in U in parallel, 854. The analytically determining the user matrix U can be computed according to an equation UV=R+error, where the error is minimized and the item matrix V is fixed. In the user matrix U, each user vector can be determined in parallel. The fixed V can be distributed to find the user vectors using a map and reduce process.

Regarding step 850, each computing device or node can receive a respective portion of the initial usage matrix R (e.g., for a subset of a set of users) for the user vectors the computing device is going to compute. For example, worker computing devices 140, 150 and 160 can receive subsets 510, 512 and 514, respectively of R in FIG. 5A for use in computing subsets 520, 522 and 524, respectively of U in FIG. 5A. The worker computing device 140 can compute entries for user vectors $\bar{u}$ U(1) to $\bar{u}$ U(200) using user vectors $\bar{u}$ R(1) to $\bar{u}$ R(200) (subset 510) and V, the worker computing device 150 can compute entries for user vectors $\bar{u}$ U(201) to $\bar{u}$ U(400) using user vectors $\bar{u}$ R(201) to $\bar{u}$ R(400) (subset 512) and V, and the worker computing device 160 can compute entries for user vectors $\bar{u}$ U(401) to $\bar{u}$ U(600) using user vectors $\bar{u}$ R(401)

to ū R(600) (subset 514) and V. In this way, the computations are divided among the worker computing devices.

In an example implementation, each worker computing device uses dedicated software that implements the analytic compute of the user vectors for a specific subset of the users of the full usage matrix, using the resource file that contains the items matrix. From a fixed item matrix V and the usage matrix R, the user vectors U can be uniquely determined in parallel across different worker computing devices for the different subsets of the users.

Figure 9C:
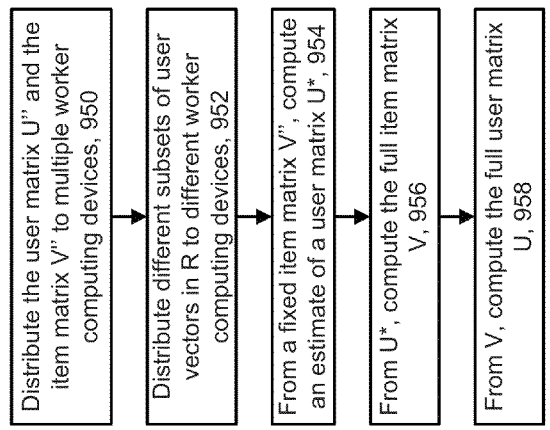
FIG. 9C depicts further details of computing the user matrix U and the item matrix in step 910 in FIG. 9A.
Figure 9B:
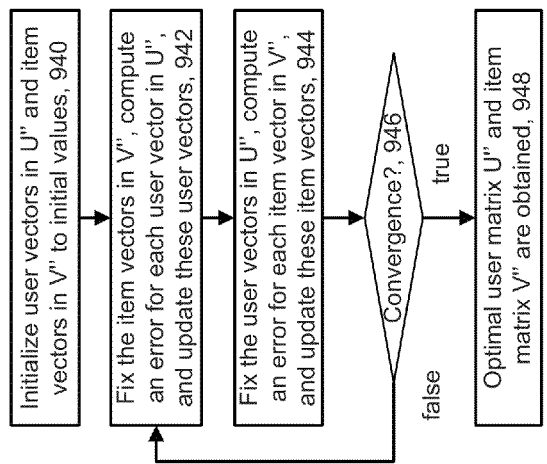
FIG. 9B depicts further details of computing the reduced user matrix U' and the reduced item matrix V" in step 906 in FIG. 9A.
Figure 9A:
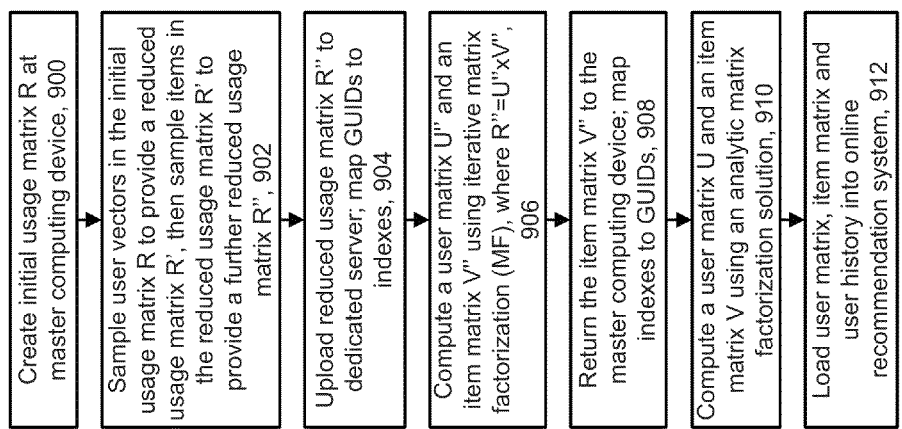
FIG. 9A depicts a process corresponding to FIG. 7A, where R" is obtained from sampling users and items in R.

FIG. 9A depicts a process corresponding to FIG. 7A, where R" is obtained from sampling users and items in R. This process has a relatively low computational burden and can therefore be done using modest computational resources such as the computational resources of a single computing device, in one possible approach. Moreover, this process further reduces the size of the reduced usage matrix so that the computational burden is also further reduced.

The steps include: create initial usage matrix R at master computing device, 900; sample user vectors in the initial usage matrix R to provide a reduced usage matrix R', then sample items in the reduced usage matrix R' to provide a further reduced usage matrix R", 902; upload reduced usage matrix R" to dedicated server; map GUIDs to indexes (see FIG. 10G), 904; compute a user matrix U" and an item matrix V" using iterative matrix factorization (MF), where R"=U"×V", 906 (see FIG. 9B); return the user matrix U" and the item matrix V" to the master computing device; map indexes to GUIDs, 908; compute a user matrix U and an item matrix V using an analytic matrix factorization solution, 910 (see FIG. 9C); and load user matrix, item matrix and user history into online recommendation system, 912.

FIG. 9B depicts further details of computing the reduced user matrix U" and the reduced item matrix V" in step 906 in FIG. 9A. The steps include: initialize user vectors in U" and item vectors in V" to initial values, 940; fix the item vectors in V", compute an error for each user vector in U", and update these user vectors (e.g., according to an update rule for U"), 942; and fix the user vectors in U", compute an error for each item vector in V", and update these item vectors (e.g., according to an update rule for V"), 944. A decision step 946 determines if there is a convergence of the iterations. For example, a convergence may be declared if the errors of steps 942 and 944 are below respective threshold error levels. If decision step 946 is true, step 948 indicates that an optimal user matrix U" and item matrix V" are obtained. If decision step 946 is false, another iteration of steps 942 and 944 occurs. Note that the order of steps 942 and 944 can be reversed.

As mentioned, in one approach, each value of an entry (e.g., mean, variance) can be subject to the update rule. Thus, step 942 can subject each value of an entry in U" to a respective update rule, and step 944 can subject each value of an entry in V" to a respective update rule.

FIG. 9C depicts further details of computing the user matrix U and the item matrix in step 910 in FIG. 9A. The steps include: distribute the item matrix V" to multiple worker computing devices, 950; distribute different subsets of user vectors in R to different worker computing devices, 952; for fixed item matrix V", analytically compute an estimate of the user matrix U called U*, 954; from U*, compute the full item matrix V; and from V, compute the full user matrix U, 956.

In some cases, if the sampling of the user vectors of R is limited to preserve the statistical quality of the usage matrix, the resulting sampled data of R' may still be too large to fit into the dedicated server's memory. The solution of FIGS. 9A to 9C is to sample the items in R' to fit the memory, thereby allowing some of the items to be dropped from the sampled set R' (e.g., sampling R' by removing columns). The columns which are selected to remove can correspond to items with the least usage signal, so that the resulting usage matrix R" is as dense as possible, i.e., the densest columns of R' can be kept while others are removed. In the example R" matrix of FIG. 10D, the second and fourth columns of R' in FIG. 10A are removed. For columns where R' is very sparse, the memory usage for item vectors corresponding to those columns will dominate the memory usage, and hence savings in memory usage are achieved by removing these columns. The user matrix U" and the item matrix V" are obtained as factors of the further reduced matrix R", and these are used to infer the full user matrix U (FIG. 5B) and the full item matrix V. In contrast, the process of FIGS. 8A to 8D found U' and the full item matrix V and used these to infer the full user matrix U.

In this process, the item matrix V" that is computed in step 906 will not include all the items of R or R'. In this case, from U", and all remaining items not in V", the remaining item vectors are found analytically to complete V. At step 910, from V, the remainder of U is completed. This approach includes distributing the computed user matrix U" to many worker computing devices (step 950). Each worker computing device also receives a respective subset of the full usage matrix R for the items it is going to compute (these are the items that were not included in the sampled set of R") (step 952). An estimate of the user matrix is computed and used to compute the full item matrix which in turn is used to compute the full user matrix U (steps 954, 956 and 958).

FIG. 10A depicts an example of a reduced usage matrix R' which is obtained by sampling users vectors (rows) from R in FIG. 5A, in accordance with step 802 of FIG. 8A. The user vectors are ū R'(1) to ū R'(10) and the item vectors are v̄ R'(1) to v̄ R'(5). The row indexes of R are also listed to indicate that the sampled user vectors are from the rows of R with indexes 1, 51, 101, 151, 201, 251, 301, 351, 401 and 451, e.g., every fiftieth user vector of R is selected in the sampling. The indexes of the user vectors in R' are 1-10.

FIG. 10B depicts a user matrix U' which is a factor of the usage matrix R' of FIG. 10A and which comprises ten rows of user vectors ū U'(1) to ū U'(10) and four columns of user factor vectors F̄ U'(1) to F̄ U'(4), in accordance with step 806 of FIG. 8A.

FIG. 10C depicts factors of the user matrices R, R' and R". The equations 1050, 1052 and 1054 indicate that R=U×V, R'=U'×V and R"=U"×V". The same item matrix V is a factor for both R and R' because it associates items with item factors in the latent factor space and this association is independent of the users. However, V" does not equal V because V" associates a subset of the items with item factors in the latent factor space. FIG. 10D depicts an example of a reduced usage matrix R" which is obtained by sampling users vectors (rows) and item vectors (columns) from R in FIG. 5A, in accordance with step 902 of FIG. 9A. The user vectors are ū R"(1) to ū R"(10) and the item vectors are v̄ R"(1), v̄ R"(3) and v̄ R"(5). In one approach, the densest item vectors (item vectors having the most filled entries) are sampled. The row indexes of R are also listed to clarify that, as in R', the sampled user vectors are from the rows of R with indexes 1, 51, 101, 151, 201, 251, 301, 351, 401 and 451, e.g., every fiftieth user vector of R is selected in the sampling. The indexes of the user vectors in R" are 1-10. Sampling of the item vectors in addition to the user vectors further reduces the amount of data which is to be processed and the associated computational burden.

FIG. 10E depicts a user matrix U" which is a factor of the usage matrix R" of FIG. 10D and which comprises ten rows of user vectors ū U"(1) to ū U"(10) and four columns of latent factor vectors F̄ U"(1) to F̄ U"(4), in accordance with step 906 of FIG. 9A.

FIG. 10F depicts a reduced item matrix V" which is a factor of the usage matrix R" of FIG. 10A and which comprises four rows of item factor vectors F̄ V"(1) to F̄ V"(4) and three columns of item vectors v̄ V"(1), v̄ V"(3) and v̄ V"(5) (the same as the like-named item vectors in V in FIG. 5C), in accordance with step 906 of FIG. 9A.

FIG. 10G depicts a mapping 1050 between GUIDs and indexes as discussed in connection with steps 804 and 808 of FIG. 8A and steps 904 and 908 of FIG. 9A. As mentioned, the storage and communication of an index substituting for a GUID can conserve network bandwidth and the burden on computational resources. In the first column of the mapping, the users are identified by GUIDs which include their first name (e.g., Joe, Jim, Lou, Beth, Kim, Kate, Sue, Jack, Betsy, Kelly). In practice, the GUID of a user can be an account number or other unique alpha-numerical identifier of a user. In the second column of the mapping, the index in R of the user vector of each user is depicted (e.g., 1, 51, 101, 151, 201, 251, 301, 351, 401 and 451). In the third column of the mapping, the index in R', R" or U' of the user vector of each user is depicted (e.g., 1-10).

Note that, generally, the initial usage matrix can be considered to be an initial matrix, the reduced usage matrix can be considered to be a reduced matrix, the user matrix can be considered to a first factor matrix of the reduced matrix, and the item matrix can be considered to a second factor matrix of the reduced matrix. Moreover, the entries in the initial matrix represent an association between a first set of entities (e.g., users or other entity) and a second set of entities (e.g., items or other entity). The techniques herein can thereby provide a recommendation to one of the entities in the first set of entities for one of the entities in the second set of entities using the first factor matrix of the initial matrix and the second factor matrix of the reduced matrix.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A computer-implemented method in a recommendation system, comprising:
sampling users in an initial usage matrix (R) to provide a reduced usage matrix (R', R") entries in the initial usage matrix represent an interest by the users in items, the users are represented by user vectors (ū R(i)) in one dimension of the initial usage matrix and the items are represented by item vectors (v̄ R(j)) in another dimension of the initial usage matrix, and the sampling results in the reduced usage matrix comprising a subset of the user vectors in the initial usage matrix R;
factoring the reduced usage matrix using iterative matrix factorization to provide a user matrix (U', U") and an item matrix (V, V") as factors of the reduced usage matrix;
analytically determining a user matrix U as a factor of the initial usage matrix based on the item matrix and the initial usage matrix, the item matrix is also a factor of the initial usage matrix; and
providing a recommendation to one of the users for one of the items using the user matrix and the item matrix which are factors of the initial usage matrix.

2. The computer-implemented method of claim 1, wherein:
the user matrix which is a factor of the reduced usage matrix comprises user vectors (ū U'(i)) for users selected by the sampling and the item matrix comprises item vectors (v̄ V(j)) for the items; and
the iterative matrix factorization initializes the user matrix which is a factor of the reduced usage matrix and the item matrix, and iteratively, until a convergence criterion is met: (a) computes an error for each of the user vectors of the user matrix which is a factor of the reduced usage matrix while the item vectors of the item matrix are fixed, and in response, updates the user vectors of the user matrix which is a factor of the reduced usage matrix and (b) computes an error for each of the item vectors of the item matrix while the user vectors of the user matrix which is a factor of the reduced usage matrix are fixed, and in response, updates the item vectors of the item matrix.

3. The computer-implemented method of claim 2, wherein:
the error for each of the user vectors of the user matrix which is a factor of the reduced usage matrix is computed according to an update rule for the user matrix which is a factor of the reduced usage matrix, the update rule is based on the reduced usage matrix, the item matrix and an error metric.

4. The computer-implemented method of claim 2, wherein:
the error for each of the item vectors of the item matrix is computed analytically according to an update rule for the item matrix which is a factor of the reduced usage matrix, the update rule is based on the reduced usage matrix, the user matrix which is a factor of the reduced usage matrix and an error metric.

5. The computer-implemented method of claim 1, wherein:
the analytically determining the user matrix which is a factor of the initial usage matrix is computed according to an update rule for the user matrix which is a factor of the initial usage matrix, the update rule is based on the initial usage matrix, the item matrix and an error metric.

6. The computer-implemented method of claim 1, wherein:
the analytically determining the user matrix which is a factor of the initial usage matrix is computed according to an equation UV=R+error, where the error is minimized and the item matrix is fixed, where U is the user matrix which is a factor of the initial usage matrix, R is the initial usage matrix and V is the item matrix.

7. The computer-implemented method of claim 6, wherein:
the analytically determining the user matrix which is a factor of the initial usage matrix comprises distributing different respective subsets of the user vectors of the initial usage matrix to different respective computing devices, and distributing at least part of the item matrix to each of the different respective computing devices, each different respective computing device solves an equation UV=R+error for the respective subset of the user vectors, where U is the user matrix which is a factor of the initial usage matrix, R is the initial usage matrix and V is the item matrix.

8. The computer-implemented method of claim 7, wherein:
the error is minimized separately for each different respective subset of the user vectors by each of the different respective computing devices.

9. The computer-implemented method of claim 7, wherein:
the user matrix comprises multi-valued entries, one value indicating an expected value and another value indicating a certainty associated with the expected value.

10. The computer-implemented method of claim 1, wherein the reduced usage matrix comprises item vectors ($\bar{v}$ R'(j), $\bar{v}$ R"(j)) for each of the items, the method further comprising:
substituting indexes for global identifiers of the items for each of the item vectors of the reduced usage matrix, the indexes have a shorter bit length than the global identifiers;
uploading, to a computing device which performs the factoring, the reduced usage matrix with the indexes substituting for the global identifiers of the items, and a mapping between the indexes and the global identifiers of the items, the computing device uses the mapping to convert the indexes back to the global identifiers after performing the factoring; and
receiving from the computing device, the item matrix, the item matrix comprises the global identifiers.

11. The computer-implemented method of claim 1, wherein the reduced usage matrix comprises item vectors ($\bar{v}$ R'(j), $\bar{v}$ R"(j)) for each of the items, further comprising:
substituting indexes for global identifiers of the users for each of the user vectors of the reduced usage matrix, the indexes have a shorter bit length than the global identifiers; and
uploading, to a computing device which performs the factoring, the reduced usage matrix with the indexes substituting for the global identifiers of the users selected by the sampling, and a mapping between the indexes and the global identifiers of the users selected by the sampling.

12. The computer-implemented method of claim 1, further comprising:
sampling items in the initial usage matrix so that the reduced usage matrix comprises item vectors ($\bar{v}$ V"(j)) for a subset of the items, but not all of the items, in the initial usage matrix.

13. A computer readable storage device having computer readable software embodied thereon for programming at least one processor to perform a method for processing a matrix, the method comprising:
sampling an initial usage matrix (R) to provide a reduced usage matrix (R"), entries in the initial usage matrix represent an interest by users in items, the users are represented by sparse user vectors ($\bar{u}$ R(i)) in one dimension of the initial usage matrix and the items are represented by item vectors ($\bar{v}$ R(j)) in another dimension of the initial usage matrix, the sampling reduces the one dimension such that sparse user vectors ($\bar{u}$ R"(i)) in the reduced usage matrix comprise a subset of the sparse user vectors in the initial usage matrix R, and the sampling also reduces the another dimension such that item vectors ($\bar{v}$ R'(j)) in the reduced usage matrix correspond to a subset, but not all, of the items in the initial usage matrix R;
factoring the reduced usage matrix using iterative matrix factorization to provide a user matrix (U") and an item matrix (V") as factors of the reduced usage matrix;
providing an item matrix (V) which is a factor of the initial usage matrix based on the user matrix and the item matrix which are factors of the reduced usage matrix, and based on items which are not represented in the item matrix;
analytically determining a user matrix which is a factor of the initial usage matrix based on the item matrix which is a factor of the initial usage matrix and the initial usage matrix R; and
providing a recommendation to one of the users for one of the items using the user matrix which is a factor of the initial usage matrix and the item matrix which is a factor of the initial usage matrix.

14. The computer readable storage device of claim 13, wherein:
the analytically determining the user matrix which is a factor of the initial usage matrix uses a map and reduce technique involving different respective computing devices.

15. The computer readable storage device of claim 13, wherein:
the user matrix which is a factor of the reduced usage matrix comprises user vectors ($\bar{u}$ U"(i)) for users selected by the sampling and the item matrix comprises item vectors ($\bar{v}$ V"(j)) for the items selected by the sampling; and
the iterative matrix factorization initializes the user matrix and the item matrix which are factors of the reduced usage matrix, and iteratively, until a convergence criterion is met: (a) computes an error for each of the user vectors of the user matrix which is a factor of the reduced usage matrix while the item vectors of the item matrix which is a factor of the reduced usage matrix are fixed, and in response, updates the user vectors of the user matrix which is a factor of the reduced usage matrix and (b) computes an error for each of the item vectors of the item matrix which is a factor of the reduced usage matrix while the user vectors of the user matrix which is a factor of the reduced usage matrix are fixed, and in response, updates the item vectors of the item matrix which is a factor of the reduced usage matrix.

16. The computer readable storage device of claim 13, wherein:
the analytically determining the user matrix which is a factor of the initial usage matrix is computed according to an equation UV=R+error, where the error is minimized and the item matrix V is fixed, and where U is the user matrix which is a factor of the initial usage matrix, R is the initial usage matrix and V is the item matrix which is a factor of the initial usage matrix.

17. A computing device, comprising:
a storage device comprising processor readable code;
an interface; and
a processor in communication with the storage device and the interface, the processor executes the processor readable code to: sample an initial matrix (R) to provide a reduced matrix (R'), the initial matrix is sparse, entries in the initial matrix represent an association between a first set of entities and a second set of entities, the first set of entities are represented by vectors ($\bar{u}$ R(i)) in one dimension of the initial matrix and the second set of entities are represented by vectors ($\bar{v}$ R(j)) in another dimension of the initial matrix, the sampling reduces the one dimension such that vectors ($\bar{u}$ R' (i)) in the reduced matrix comprise a subset of the vectors in the one dimension of the initial matrix, factor the reduced matrix to provide a first factor matrix (U') of the reduced matrix and a second factor matrix (V) of the reduced matrix, analytically determine a first factor matrix (U) of the initial matrix based on the second factor matrix and the initial matrix, and provide a recommendation to one of the entities in the first set of entities for one of the entities in the second set of entities using the first factor matrix of the initial matrix and the second factor matrix of the reduced matrix.

18. The computing device of claim 17, wherein:

the second factor matrix of the reduced matrix R' is also a factor of the initial matrix; and the processor analytically determines the first factor matrix of the initial matrix according to an equation UV=R+error, where the error is minimized and the matrix V is fixed, and where U is the first factor matrix of the initial matrix, R is the initial matrix and V is the second factor matrix.

19. The computing device of claim 17, wherein:

the processor, to analytically determine the first factor matrix of the initial matrix, distributes different respective subsets of the vectors in the one dimension of the initial matrix to different respective computing devices, and distributes at least part of the second factor matrix and at least part of the initial matrix to each of the different respective computing devices, each different respective computing device solves an equation UV=R+error for a different respective subset of the vectors in the one dimension of the initial matrix which is distributed to the different respective computing device, where U is the first factor matrix of the initial matrix, R is the initial matrix and V is the second factor matrix.

20. The computing device of claim 17, wherein:

the second factor matrix is fixed and the error is minimized separately for each different respective subset of the vectors in the one dimension of the initial matrix by each of the different respective computing devices.

* * * * *